(12) United States Patent
Kawabata (10) Patent No.: US 8,271,228 B2
(45) Date of Patent: Sep. 18, 2012

(54) TRACE INFORMATION PROCESSING DEVICE, TRACE INFORMATION PROCESSING METHOD, INFORMATION RECORDING MEDIUM, AND PROGRAM

(75) Inventor: Yasuhiro Kawabata, Tokyo (JP)

(73) Assignee: Konami Digital Entertainment Co. Ltd., Tokyo (JP)

( * ) Notice: Subject to any disclaimer, the term of this patent is extended or adjusted under 35 U.S.C. 154(b) by 1069 days.

(21) Appl. No.: 12/279,700

(22) PCT Filed: Feb. 13, 2007

(86) PCT No.: PCT/JP2007/052532
§ 371 (c)(1),
(2), (4) Date: Aug. 15, 2008

(87) PCT Pub. No.: WO2007/094326
PCT Pub. Date: Aug. 23, 2007

(65) Prior Publication Data
US 2010/0220056 A1 Sep. 2, 2010

(30) Foreign Application Priority Data
Feb. 15, 2006 (JP) .................................. 2006-037735

(51) Int. Cl.
*G01B 3/22* (2006.01)
(52) U.S. Cl. ...................................................... 702/168
(58) Field of Classification Search .................. 702/95; 382/188, 316
See application file for complete search history.

(56) References Cited

U.S. PATENT DOCUMENTS

| | | | | |
|---|---|---|---|---|
| 4,853,971 A | * | 8/1989 | Nonura | 382/241 |
| 5,467,407 A | | 11/1995 | Guberman et al. | |
| 5,583,975 A | * | 12/1996 | Naka et al. | 345/426 |

FOREIGN PATENT DOCUMENTS

| | | |
|---|---|---|
| JP | 10-91803 A | 4/1998 |
| JP | 2002-282542 A | 10/2002 |
| JP | 2005-204754 A | 8/2005 |
| TW | M259629 | 3/2005 |
| TW | M262770 | 4/2005 |

OTHER PUBLICATIONS

International Search Report PCT/JP2007/052532 dated Mar. 6, 2007.
Taiwanese Office Action in related Application No. 096105666 dated May 27, 2009, 10 pages total.
European Search Report dated Feb. 20, 2009.

* cited by examiner

*Primary Examiner* — Mohamed Charioui
(74) *Attorney, Agent, or Firm* — Howard & Howard Attorneys PLLC (57) ABSTRACT

In a trajectory information processing device (201) for acquiring from a trajectory of a spiral-shaped graphic easy for a person to enter the input information intended by the person, an input receiving unit (202) receives input of coordinate information of a trajectory, a closed curve acquisition unit (203) repeatedly acquires a closed curve wherein the trajectory crosses over the trajectory for the first time after the starting point and removes from the trajectory the closed curve and the curve preceding thereto for the coordinate information of a trajectory whose input was received, and a vortex information outputting unit (204) outputs changes in the time interval at which closed curves are acquired as information indicating the intensity of the vortex motion of the trajectory.

8 Claims, 4 Drawing Sheets

FIG. 5B

TRACE INFORMATION PROCESSING DEVICE, TRACE INFORMATION PROCESSING METHOD, INFORMATION RECORDING MEDIUM, AND PROGRAM

TECHNICAL FIELD

The present invention relates to a trajectory information processing device and a trajectory information processing method suitable for acquiring from a trajectory of a spiral-shaped graphic that is easy for a person to enter the input information intended by the person, a computer readable information recording medium storing a program for realizing these on a computer, and the program.

BACKGROUND ART

Conventionally, coordinate input devices that employ a touch pen and touch panel have been utilized in PDA (Personal Data Assistance) devices, handheld game devices, and the like. Additionally, systems in which various selections are made by touching a touch panel with a finger, such as cash dispensers and railway ticket machines, have also been proposed. In general, such touch panel based inputs are made by touching menu items, button items, etc., that are superimposed and displayed on the touch panel using a finger or touch pen.

On the other hand, technology that applies such a technique in a game device has been disclosed in the following literature:

Patent Literature 1: Unexamined Japanese Patent Application KOKAI Publication No. 2005-204754

Here, in Patent Literature 1, there has been proposed a game device that is based on a touch panel. In the literature, a technique for determining a type of attack on an enemy character based on the graphical shape of an input trajectory when a predetermined graphic is drawn by a player on a touch panel using a finger is disclosed.

DISCLOSURE OF THE INVENTION

Problem to be Solved by the Invention

On the other hand, when a person tests a writing instrument such as a ballpoint pen by writing, a person generally draws a spiral-shaped graphic that moves in a certain direction. Thus, when information is to be inputted based on a person's drawing of a trajectory using a touch pen or finger, etc., problems arise as to how to use such "natural" and "primitive" movement as input information.

The present invention has been made to overcome such problems, and it is an object of the present invention to provide a trajectory information processing device and a trajectory information processing method suitable for acquiring from a trajectory of a spiral-shaped graphic that is easy for a person to enter the input information intended by the person, a computer readable information recording medium storing a program for realizing these on a computer, and the program.

Means for Solving the Problem

To achieve the above objective, the following invention will be disclosed according to the principle of the present invention.

A trajectory information processing device according to a first aspect of the present invention includes an input receiving unit, a closed curve acquisition unit, and a vortex information outputting unit, which are configured as follows.

Here, the input receiving unit receives input of coordinate information of a trajectory.

Typically, the input receiving unit is a device that receives trajectory input during the period the touch panel is touched by a touch pen or finger. In addition, cases where a trajectory is drawn by holding down a mouse button and moving and dragging the mouse, and cases where input of three-dimensional trajectory coordinate data is received via a computer communication network are also included.

The trajectory presumed here is not a spiral shape that converges toward one point, but rather a spiral shape that is drawn with a single stroke, crossing over itself, such as that is written when a ballpoint pen is tested. The coordinate information is received in the order in which the user draws the trajectory.

Typically, coordinate information whose input is received is stored sequentially in the order in a coordinate storage unit prepared in RAM or the like. Additionally, a closed curve storage unit for storing closed curve information that is acquired by a closed curve acquisition unit described later is also prepared in RAM, etc.

Meanwhile, the closed curve acquisition unit repeats the followings for the coordinate information of the trajectory whose input was received:

(a) acquiring a closed curve wherein the trajectory crosses over the trajectory for the first time after its starting point; and (b) removing the closed curve and the preceding curve from the trajectory, and making the crossover point as the new starting point.

That is, when it is detected that a trajectory has crossed over a trajectory at an intersection point so as to form a closed curve, the section that forms the closed curve is removed from the trajectory, establishing the intersection point as the next starting point. In this manner, the "closed curve" element, having a size that is clearly understood for any person, is used to associate the spiral-shaped trajectory and the input information assumed by any such person.

Specifically, each time coordinate information is stored in the coordinate storage unit, the determination is made as to whether or not one of the line segments that connects adjacent coordinate information other than the newly stored coordinate information from among the sequentially stored coordinate information, and the line segment that connects the newly stored coordinate information and the coordinate information stored immediately before the newly stored coordinate information cross over each other.

Then, when the determination is made that crossover has occurred, the followings are repeated:

(a) the closed curve information that specifies the current time as the time at which the closed curve was acquired is newly stored in the closed curve storage unit; and (b) the coordinate information stored prior to the newly stored coordinate information is removed from the coordinate storage unit, and the coordinate information of the crossover point is inserted immediately before the newly stored coordinate information so as to update the coordinate storage unit.

Furthermore, the vortex information outputting unit outputs changes in the time interval at which closed curves are acquired as information indicating the intensity of the vortex motion of the trajectory.

The vortices of the spiral may also be viewed as the number of closed curves. In a case where a great number of closed curves are drawn in a short period of time, the number of vortices drawn per unit time is high. Here, in the present invention, the time interval at which closed curves are detected is outputted as information indicating the intensity of the vortex motion of the trajectory, to thereby appropriately distinguish a case where a person draws a vortex with an intensity from a case where a person draws a vortex slowly.

Specifically, each time new closed curve information is stored in the closed curve storage unit, the time interval is calculated based on the difference between the time of the newly stored closed curve information and the time of the closed curve information stored immediately before the newly stored closed curve information, and the numeric value associated in advance with that time interval is treated as a numeric parameter inputted by the user.

In this manner, the present invention makes it possible to acquire a series of closed curves from a spiral-shaped trajectory that is easy for a person to enter, and efficiently and quickly acquire numeric parameter input information indicating the intensity of the vortex motion intended by the person from the time interval at which the closed curves are detected.

Further, in the trajectory information processing device of the present invention, the vortex information outputting unit may be configured to further output the position of the barycenter of an acquired closed curve as information indicating the general movement of the vortex motion of the trajectory.

Specifically, in a case where the determination is made that crossover has occurred, the barycentric coordinate of the closed curve, which has vertices at positions corresponding to the coordinate information of the crossover point and, from among the sequentially stored coordinate information, the coordinate information from the lately stored coordinate information from among the adjacently stored coordinate information that form a line segment that includes the crossover point to the coordinate information stored immediately before the newly stored coordinate information, is calculated, and the calculated coordinate is further specified in the closed curve information as the barycentric coordinate of the closed curve. Then, each time closed curve information is newly stored in the closed curve storage unit, the vortex information outputting unit further outputs the position of the barycenter of closed curve specified in the newly stored closed curve information as position information specified by the user at the time specified in the newly stored closed curve information.

Generally, while the general direction of movement of a touch pen or finger touching the touch panel is obtained by taking the average of the position coordinates of the trajectory, it has been difficult to obtain the general movement of a vortex motion when a vortex is drawn since this average value itself greatly fluctuates in a short period of time. In the present invention, the acquired barycenter of the closed curve is utilized to prevent such fluctuation in a short period of time, thereby establishing general movement that follows the intention of the person.

As described above, the present invention acquires a series of closed curves from a trajectory of a spiral-shaped graphic that is easy for a person to enter, thereby making it possible to acquire input information indicating the general movement of a vortex motion intended by the person from the state of the movement of the barycenter of those closed curves.

Further, the trajectory information processing device of the present invention further comprises a position updating unit, and can be constituted as follows.

That is, the position updating unit updates the position of a character disposed within a virtual space wherein the trajectory is drawn so that the position moves close to the position of the barycenter of the closed curve last outputted as the information of the general movement by the vortex information outputting unit.

The position of this character is stored in a position storage unit comprising RAM, etc. Further, in order to move the character close to the position of the barycenter, simulation of exerting on the character a force of a size specified in the parameter information last outputted by the vortex information outputting unit, i.e., a force directed from the stored character position to the position specified in the position information last outputted by the vortex information outputting unit, is performed.

Additionally, the closed curve acquisition unit may further calculate the area of the region enclosed in the closed curve from the coordinate information of the positions of the vertices of the closed curve, and further specify in the closed curve information and newly store in the closed curve storage unit the calculated area as the area of the region enclosed in the closed curve so as to establish the size of that force exerted on the character not as the last outputted parameter information, but rather as the value of the product of the last outputted parameter information and the area of the region specified in the closed curve information last stored.

The present invention is according to the preferred embodiments of the above-described aspect. Because the position of the character is updated so that it is brought closer to the position of the barycenter of the closed curve, the present invention makes it possible to readily realize a mode wherein a person, object, boat, or the like gets caught up in a real-world vortex phenomenon such as a tornado or a Naruto vortex without executing exact simulation.

Further, the trajectory information processing device of the present invention further comprises a parameter updating unit, and can be constituted as follows.

That is, the parameter updating unit updates a predetermined parameter of the character so that the increment increases to the extent that the last outputted time interval as intensity information by the vortex information outputting unit decreases.

The numeric value of the character attack parameter is typically used as this predetermined parameter, and the predetermined parameter is stored in RAM or the like as well.

A predetermined association is made with the increment as well so that the increment is calculated in such a manner that the value increases to the extent the numeric parameter information associated with the last outputted time interval decreases.

The present invention is according to the preferred embodiments of the above-described invention. In a case where the present invention is applied to a game device, various situations can be expressed. For example, when a spiral is intensely entered by a player for "a magical wind character who obtains tornado powers to attack an enemy character," the character moves near a tornado and is filled with attack power from the tornado.

A trajectory information processing method according to another aspect of the present invention is executed in the trajectory information processing device that includes the input receiving unit, the closed curve acquisition unit, and the vortex information outputting unit, and includes an input receiving step, a closed curve acquisition step, and a vortex information outputting step, which are configured as follows.

Here, in the input receiving step, the input receiving unit receives input of coordinate information of a trajectory.

On the other hand, in the closed curve acquisition step, the closed curve acquisition unit repeatedly performs the followings for the coordinate information of a trajectory whose input was received:

(a) acquiring a closed curve wherein the trajectory crosses over the trajectory for the first time after its starting point; and (b) removing the closed curve and the preceding curve from the trajectory, and making the crossover point as the new starting point.

Furthermore, in the vortex information outputting step, the vortex information outputting unit outputs changes in the time interval at which closed curves are acquired as information indicating the intensity of the vortex motion of the trajectory.

A program according to another aspect of the present invention is constituted so as to cause a computer to function as the trajectory information processing device described above, and to execute the trajectory information processing method described above on the computer.

The program of the present invention can be recorded on a computer readable information storage medium, such as a compact disk, a flexible disk, a hard disk, a magneto-optical disk, a digital video disk, a magnetic tape, or a semiconductor memory.

The program can be distributed and sold, independently of a computer which executes the program, over a computer communication network. The information storage medium can be distributed and sold independently of the computer.

Effect of the Invention

According to the present invention, it is possible to provide a trajectory information processing device and a trajectory information processing method suitable for acquiring from a trajectory of a spiral-shaped graphic that is easy for a person to enter the input information intended by the person, a computer readable information recording medium storing a program for realizing these on a computer, and the program.

DESCRIPTION OF REFERENCE NUMERALS 101 information processing device
102 CPU
103 RAM
104 ROM
105 input device
106 image processor
107 liquid crystal display
108 sound processor
109 speaker
110 cassette reader
201 trajectory information processing device
202 input receiving unit
203 closed curve acquisition unit
204 vortex information outputting unit
205 position updating unit
206 parameter updating unit
501 trajectory
502 closed curve
503 barycenter

BEST MODE FOR CARRYING OUT THE INVENTION

An embodiment of the present invention will be described below. While the following describes an embodiment in which the present invention is carried out for ease of understanding to an information processing device for handheld game devices, the embodiment to be described below is given by way of illustration only, and not to limit the scope of the invention. Therefore, persons skilled in the art can employ embodiments in which the individual elements or all the elements are replaced with equivalent ones, and which are also encompassed in the scope of the invention.

Embodiment 1

Figure 1:
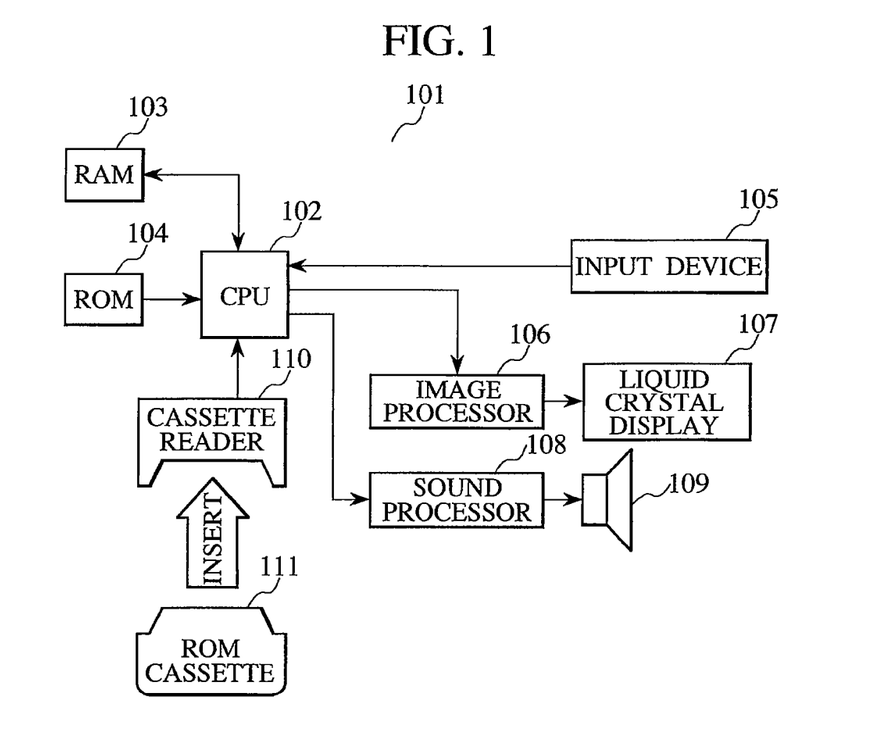
FIG. 1 is a schematic diagram illustrating the schematic configuration of a typical information processing device on which a trajectory information processing device of the present invention will be realized.

FIG. 1 is an explanatory diagram illustrating the schematic configuration of a general information processing device on which a trajectory information processing device of the present invention will be realized. A description is given below with reference to this drawing.

The information processing device 101 comprises a CPU (Central Processing Unit) 102, a RAM (Random Access Memory) 103, a ROM (Read Only Memory) 104, an input device 105, an image processor 106, a liquid crystal display 107, a sound processor 108, a speaker 109, and a cassette reader 110.

The CPU 102 controls each unit of the information processing device 101. The storage area of the RAM 103, the storage area of the ROM 104, and the storage area of a ROM cassette 111 inserted in the cassette reader 110 are all mapped in a single memory space managed by the CPU 102, and the CPU 102 is capable of acquiring information stored therein by reading the respective addresses at which the storage areas are mapped. The CPU 102 is also capable of writing to the storage area of the RAM 103.

Additionally, the register that serves as an interface when the CPU 102 provides various commands to the image processor 106 and the sound processor 108 and, besides, acquires information from the input device 105 is also mapped in the memory space, making it possible to provide commands by writing data expressing a command to a predetermined address and, once the data are read from the predetermined address, acquire information.

When the power supply of the information processing device 101 is turned on, the CPU 102 executes a program that is started from the address at which the storage area of the ROM cassette 111 inserted in the cassette reader 110 is mapped. The RAM 103 is used as a temporary storage area for a variety of purposes. The RAM 104 stores a BIOS (Basic Input/Output System) routine provided by the information processing device 101 that can be suitably called from the program within the ROM cassette 111.

The input device 105 reflects the input from buttons that receive command input expressing direction and the input from buttons that receive command input distinguishing various operations into a register mapped in the memory space, and also receives input indicating whether or not the touch panel affixed to the front surface of the liquid crystal display 107 has been pressed and, if so, the coordinate thereof.

The liquid crystal display 107 is managed by the image processor 106. When the CPU 102 writes values generated by calculation and appropriately transfers information from the ROM cassette 111 inserted in the cassette reader 110 to the storage area for storing tiles mapped in the memory space and to the storage area for storing object attribute memory, a sprite image is displayed on the liquid crystal display 107.

The number of liquid crystal displays 107 is generally either one or a plurality. When there is a plurality, one liquid crystal display 107 may be configured as display dedicated while the other liquid crystal display 107 may have a touch panel affixed thereto.

Furthermore, the information processing device 101 is used as a typical handheld game device, and the technology of storage area management of the present invention is applied to the management of the area in which tiles are stored. Nevertheless, the technology of storage area management of the present invention may be applied to general computers as well due to the bias that exists in sizes preferably maintained, and such an embodiment is also included in the scope of the present invention.

(Trajectory Information Processing Device)

Figure 2:
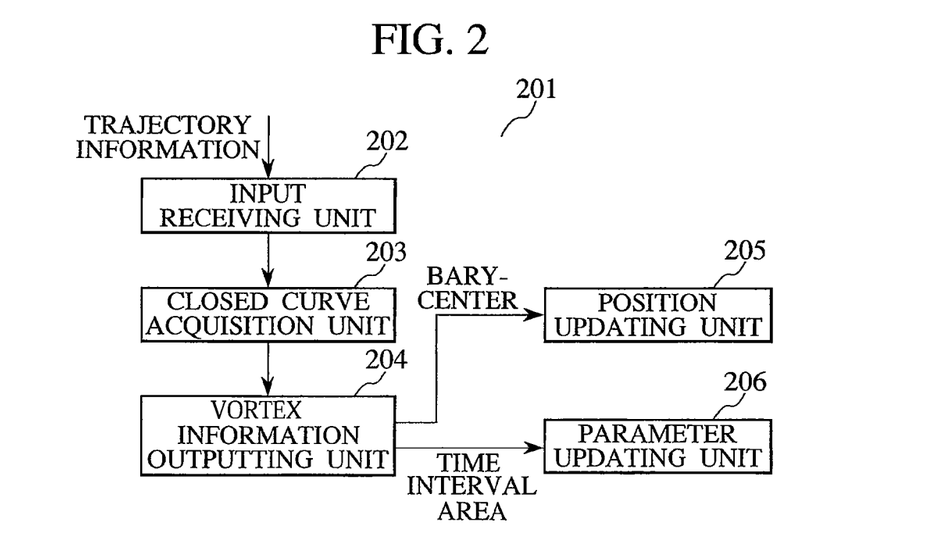
FIG. 2 is a schematic diagram illustrating the schematic configuration of a trajectory information processing device according to the embodiment.

FIG. 2 is an explanatory diagram illustrating the schematic configuration of a trajectory information processing device realized by executing a program on the information processing device described above. A description is given below with reference to this drawing.

As shown in the figure, a trajectory information processing device 201 includes an input receiving unit 202, a closed curve acquisition unit 203, a vortex information outputting unit 204, a position updating unit 205, and a parameter updating unit 206.

Additionally, a storage area prepared in the RAM 103 stores various information such as the coordinate information of points included in the inputted trajectory, position information of a character displayed on the screen, and parameter information of the character.

Here, the input receiving unit 202 receives input of coordinate information of a trajectory.

While the touch panel of the input device 105 of the information processing device 101 is used as the input receiving unit 202 in this embodiment, a mouse can be used as well.

The following information inputs are acquired from the touch panel:

(a) Whether or not a finger or touch pen is presently in contact with the touch panel. Hereinafter, the state in which a finger or touch pen comes in contact with the touch panel is referred to as "press," and a state in which a finger or touch pen is moved away from the touch penal is referred to as "release." "Press" and "release" are operations similarly performed using a mouse, and the operation where a finger or touch pen is moved between the "press" and "release" corresponds to "dragging" with the mouse.

(b) The location of position coordinate where a finger or touch pen is pressed. The touch panel has a predetermined definition (resolution). With a mouse, the position coordinate specified by the mouse cursor is generally expressed according to the definition of the screen.

Meanwhile, the closed curve acquisition unit 203 acquires the closed curve and removes the closed curve from the trajectory each time a trajectory whose input is received draws a closed curve. As a result, the coordinate information inputted from the touch panel of the input device 105 is sequentially recorded in the RAM 103, becoming the coordinate information of the trajectory, and the CPU 102 views this coordinate information so as to check whether or not a closed curve has been formed. The processing details will be described later.

Furthermore, the vortex information outputting unit 204 outputs changes in the time interval at which closed curves are acquired as information indicating the intensity of the vortex motion of the trajectory. This vortex motion intensity information can be utilized as a numeric parameter inputted by the user. The output destination is typically the RAM 103.

The position updating unit 205 updates the position of a character disposed within a virtual space wherein the trajectory is drawn so that the position moves close to the position of the barycenter of the closed curve last outputted as the information of the general movement by the vortex information outputting unit 204. The position of the character that is to be updated is typically stored within the RAM 103.

Additionally, the parameter updating unit 206 updates a predetermined parameter of the character so that the increment increases to the extent that the time interval last outputted as the intensity information by the vortex information outputting unit 204 decreases. The parameter of the character that is to be updated is typically stored within the RAM 103 as well.

Figure 3:
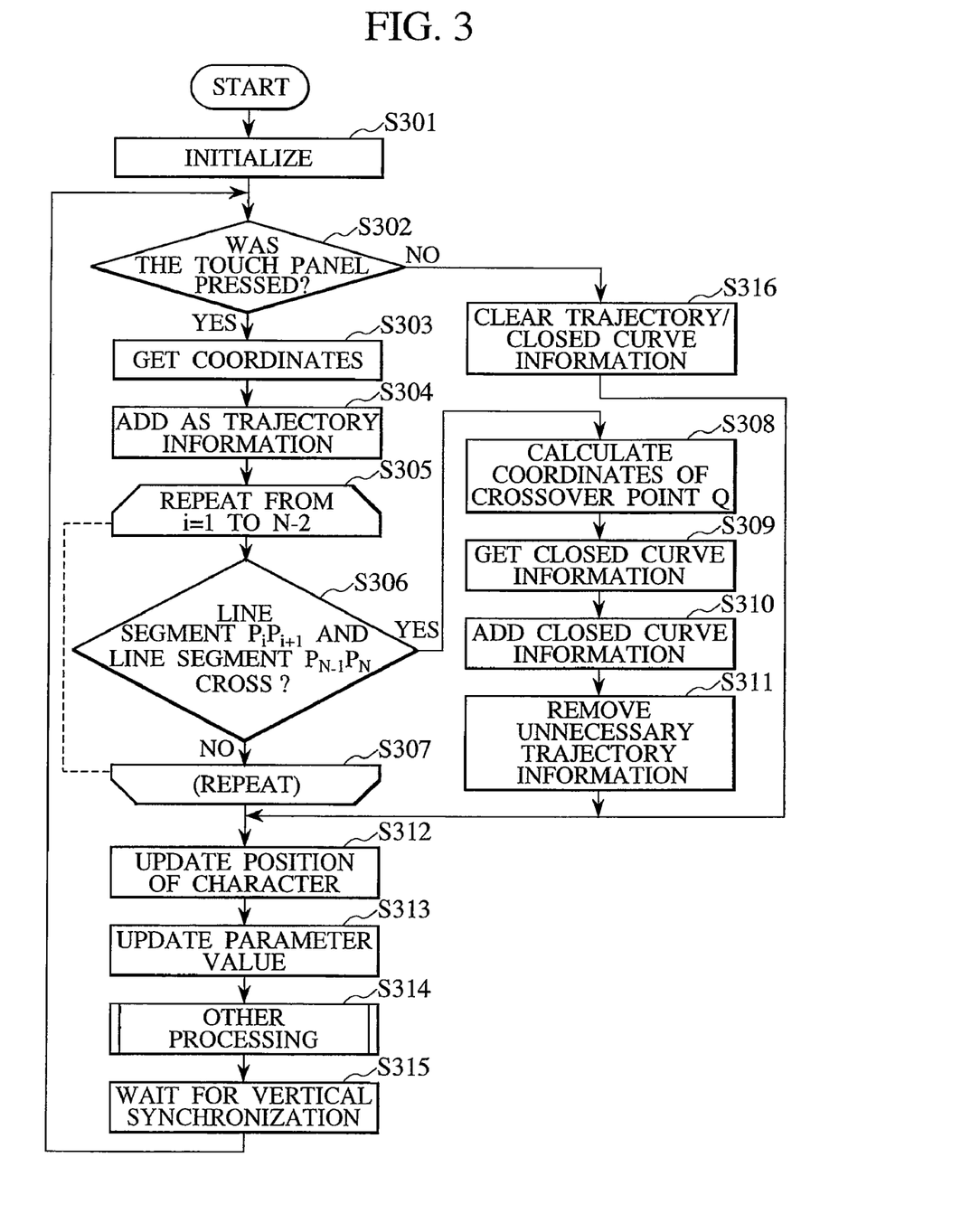
FIG. 3 is a flowchart illustrating the flow of control of a trajectory information processing method executed on a trajectory information processing device according to the embodiment.

FIG. 3 is a flowchart illustrating the general flow of control of the trajectory information processing method executed in the trajectory information processing device 201. A description is given below with reference to this drawing.

When this processing is started, the CPU 102 initializes the RAM 103 (step S301). The RAM 103 maintains areas such as the following for storing information:

(a) Trajectory information area: This area stores the history of the position information of coordinates detected while the touch panel of the input device 105 is pressed. When the coordinates stored in the trajectory information area are sequentially connected, the trajectory of the movement in the pressed state can be drawn.

(b) Closed curve area: This area stores the information of each detected closed curve, including the time at which the closed curve was detected, the barycentric coordinate of the region enclosed in the closed curve, and the area of the region enclosed in the closed curve.

(c) Position area: This area stores the current position coordinates of the character whose position is moved by trajectory input.

(d) Parameter area: This area stores the parameters of the attack power given to the character by the spiral-shaped trajectory input.

The trajectory information area and the closed curve area can be configured using arrays and lists. Additionally, a technique wherein each area is permitted a limited number of elements, and the oldest element is deleted and overwritten when the upper limit is reached may be employed. This technique is similar to a so-called ring buffer.

Initialization changes the trajectory information area and the closed curve area to a state in which there are no elements. Initialization also provides the position area and the parameter area with appropriate initial values. Each of the initial values may be, for example, a value that changes up until the processing or a value that was previously saved.

Then, when the processing is started, the CPU 102 monitors the input device 105 and checks whether or not the touch panel is pressed (step S302). In a case where the touch panel is pressed (step S302; Yes), the CPU 102 acquires the pressed coordinate from the touch panel of the input device 105 (step S303), and adds the coordinate to the trajectory information area (step S304).

Next, the CPU 102 follows the series of coordinates stored in the trajectory information area, and checks whether or not a closed curve has been formed.

Figure 4A:
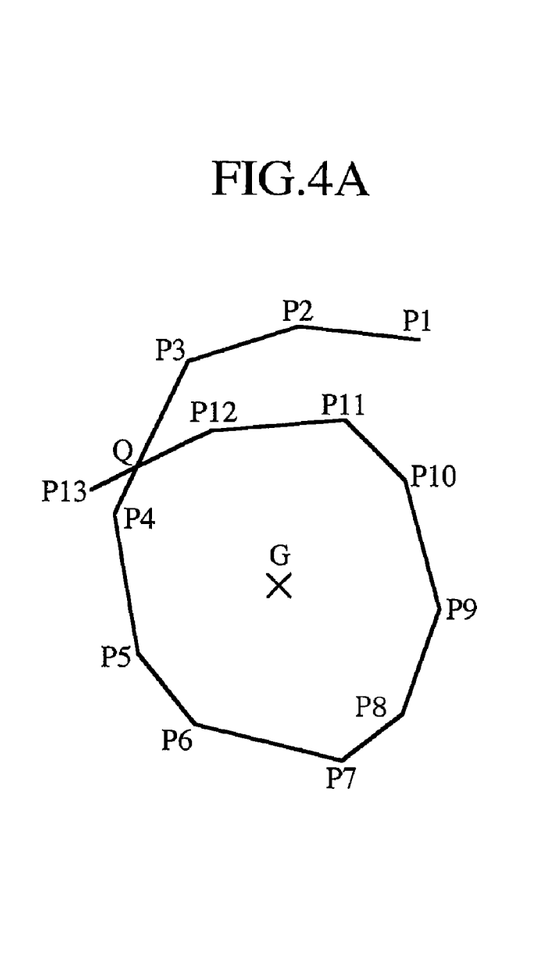
FIG. 4A and FIG. 4B are explanatory diagrams that explain the method used to check whether or not a closed curve has been drawn.
Figure 4B:
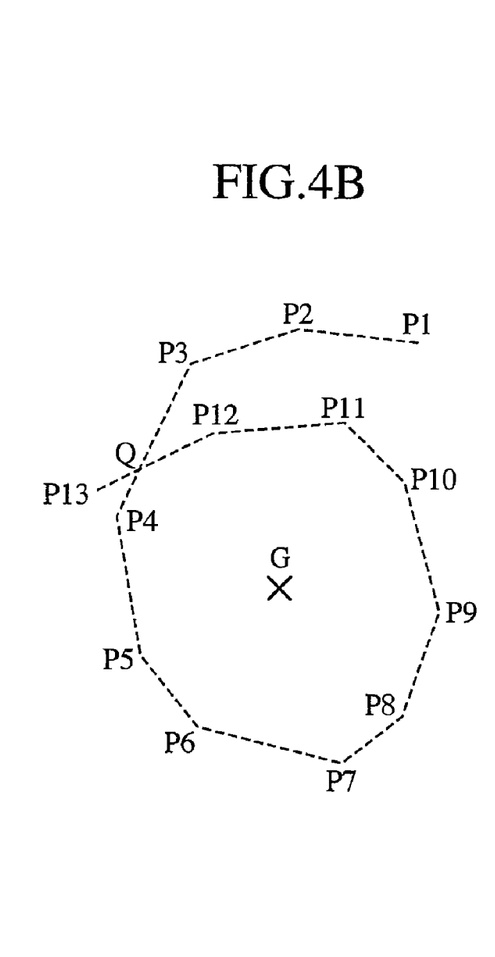

FIG. 4 is an explanatory diagram that explains the method used to check whether or not a closed curve has been drawn. A description is given below with reference to this drawing.

The trajectory shown in FIG. 4A is made when N number of points, i.e., $P_1, P_2, P_3, \ldots, P_N$, are connected sequentially in this order. In this case, the coordinates of points $P_1, P_2, P_3, \ldots, P_N$ are registered sequentially in this order in the trajectory information area. The point last registered is $P_N$, and the point corresponding to the "starting point" first registered in this processing is $P_1$. This figure illustrates the case when N=13.

Here, during the period the counter i increases from 1 to N−2, the CPU 102 sequentially increases the counter i and repeats the processing up to step S307 (step S305).

That is, the CPU 102 refers to the trajectory information area and checks whether or not the line segment $P_iP_{i+1}$ and the line segment $P_{N-1}P_N$ intersect (step S306). If they do not intersect (step S306; No), the processing is repeated until step S305 (step S307). On the other hand, if they do intersect (step S306; Yes), the repetition ends and the flow proceeds to step S308.

Then, once the intersection of the line segment $P_iP_{i+1}$ and the line segment $P_{N-1}P_N$ has been detected, the coordinate of the intersection point Q is obtained (step S308). In the example shown in FIG. 4A, i=3. As shown in this figure, the vertices of the closed curve are sequentially connected in the order of Q, $P_{i+1}, \ldots, P_{N-1}$, Q.

Next, closed curve information such as the followings are acquired (step S309).

(a) Current time: The time at which the closed curve Q, $P_{i+1}, \ldots, P_{N-1}$, Q was drawn.

(b) The barycentric coordinate G of the region enclosed in the closed curve Q, $P_{i+1}, \ldots, P_{N-1}$, Q.

(c) The area of the region enclosed in the closed curve Q, $P_{i+1}, \ldots, P_{N-1}$, Q.

Here, the current time used may be a value of a counter that indicates the elapsed time since the power of the information processing device 101 was turned on, for example. Additionally, the barycentric coordinate G and the area may be simply obtained using a known computer graphic technique.

Then, the acquired closed curve information is added to the closed curve area (step S310), and the coordinate information of points $P_1, \ldots, P_{N-1}$ of the trajectory information area is replaced with the information of the coordinate of point Q so as to remove the closed curve and the line preceding thereto from the trajectory (step S311). With this arrangement, the information to be stored in the trajectory information area is changed from:

$P_1, \ldots, P_{N-1}, P_N$ to:

Q, $P_N$

FIG. 4B shows the state of the trajectory after the removal. As shown in this figure, only the line segment connecting the detected intersection point Q and the position coordinate $P_N$ of the trajectory last inputted (in this figure, N=13) remains, and the removed sections are indicated by the dashed lines.

Subsequently, the flow proceeds to step S312.

On the other hand, in a case where crossover is not detected and the repetition of step S305 to step S307 ends, the flow proceeds to step S312.

With such processing repeated at an appropriate interval, each time the player draws a spiral so as to generate and draw a closed curve, closed curve information is added and accumulated trajectory information is updated, thereby establishing the intersection point that forms the closed curve as the new starting point.

Figure 5A:
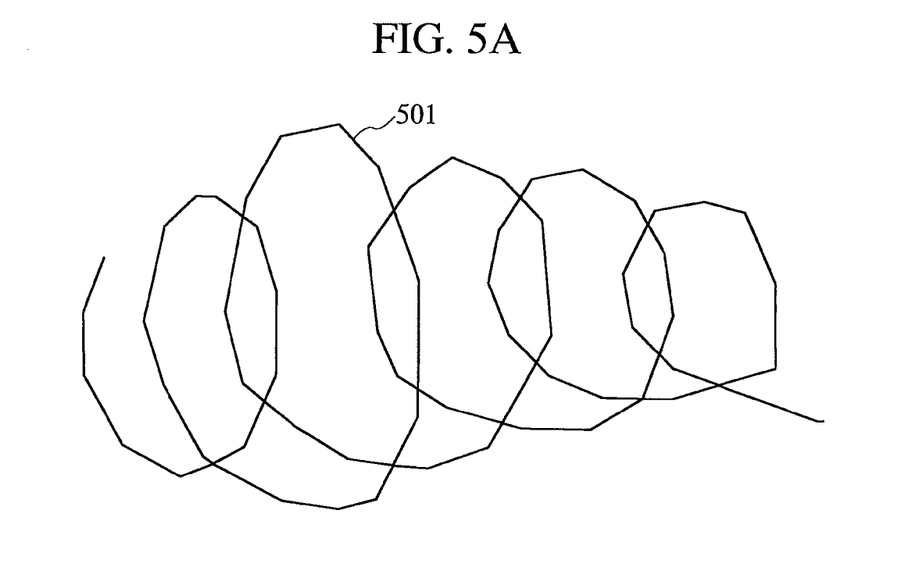
FIG. 5A and FIG. 5B are explanatory diagrams indicated the relationship between a drawn trajectory and detected closed curves.
Figure 5B:
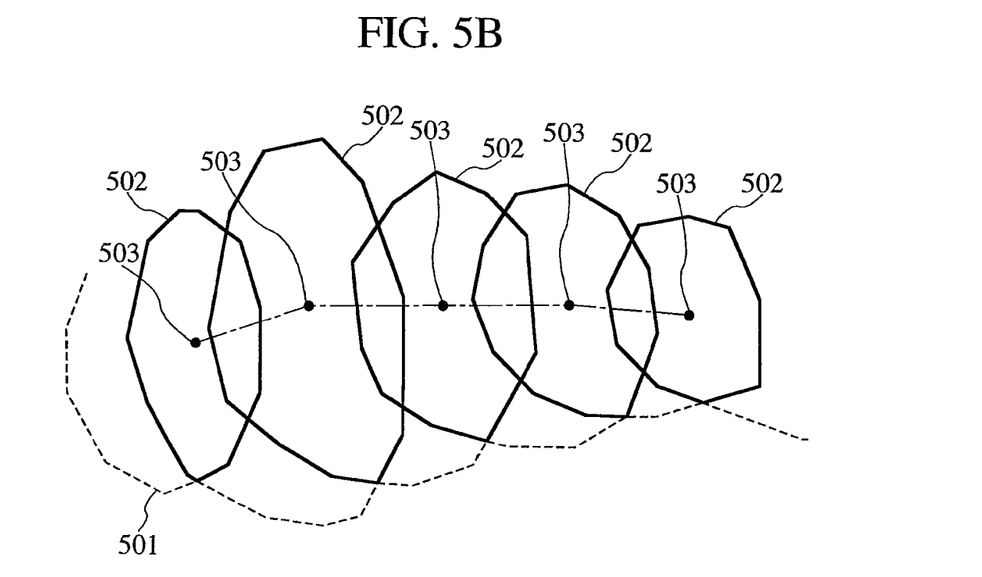

FIG. 5 is an explanatory diagram illustrating the relationship between a drawn trajectory and detected closed curves. A description is given below with reference to this drawing.

When a trajectory 501 is drawn as shown in FIG. 5A, a closed curve 502 is detected at each point where the trajectory crosses over itself as shown in FIG. 5B (the trajectory 501 is indicated by the dashed line in FIG. 5B). The general direction of movement in which the trajectory 501 proceeds (the dashed-dotted line in the figure) can be known when barycenters 503 of the closed curves 502 are followed sequentially.

The subsequent processing can be suitably changed according to the type of game realized with the information processing device 101. First, the position of the character is updated with reference to the closed curve area and other game virtual world information (step S312).

The closed curve area can conceivably accumulate the information of 0 or more number of closed curves, and store past generated vortices one by one. For example, the barycenter of each closed curve can conceivably exert a "gravitational pull" on the character so as to update the position of the character.

At this time, the difference between the current time and the time at which the closed curve was generated may be obtained so as to decrease the contribution from the closed curve to the extent this difference increases (for example, in inverse proportion to elapsed time, in inverse proportion to the square, exponential attenuation, etc.). This corresponds to the attenuation of the intensity of the vortex according to elapsed time. Additionally, the area of the closed curve may be multiplied by the difference so as to change the intensity of the "gravitational pull.": when the player draws a large closed curve, a larger "gravitational pull" is generated.

That is, the gravitational vector from the position of the character toward the barycenter of the closed curve is taken into consideration, and the size thereof is established as the size determined as described above. Then, the force exerted on the character is obtained from the total sum of these values and the total sum of the various external forces set in the virtual space, and the acceleration of the character can be obtained by dividing the identified force by the weight of the virtual character.

The increment in the moving speed of the character can be obtained by multiplying this value by the time stride used in simulation, and the variation of the change in the position of the character at the time stride can be obtained by multiplying the stride by the average value of the moving speeds before and after the increment is added. With this arrangement, it is possible to move the character close to the barycenter of the closed curve.

Next, the value of the parameter is updated with reference to the closed curve area (step S313). While a technique similar to that described above for "gravitational pull" may also be used for the amount of the parameter value update, a technique wherein the amount added to the parameter value increases to the extent one of the following difference values decreases is also conceivable:

(a) the difference between the current time and the time at which a closed curve was last drawn (b) the difference between the time a closed curve was last drawn and the time a closed curve was previously drawn (c) the series of differences between the times when closed curves were drawn, or (d) a combination thereof.

Since vortex motion conceivably intensifies to the extent the time interval at which closed curves are drawn decreases, the increment in the "energy of the tornado" given to the "magical wind character" may conceivably be a value that is inversely proportional to the time interval. Additionally, the increment is also typically associated with time interval ranges in advance.

Furthermore, the above (a) expresses the attenuation of the turning force of the vortex similar to the case of "gravitational pull," and thus may employ a coefficient and calculation method different from those of the above (b) and (c). For example, the calculation may be designed so that the updating of the parameter value is not affected once the difference between the times of above (a) reaches a certain value or higher, etc.

Further, to obtain from the difference the amount to be contributed or added, a technique wherein calculations are performed by applying a predetermined increasing function or decreasing function to the difference, or a technique wherein the difference is provided with a plurality of stages of a certain degree so as to establish and use as reference a table that associates the amount contributed or added with each stage may also be employed.

Next, after other required processing is executed (step S314), the mode changes to waiting for vertical synchronization (step S315) and touch panel detection is performed at a certain time interval (typically 1/60 second). Then, the flow returns to step S302.

The required processing of step S314 involves, for example, actually differentiating and displaying the trajectories and closed curves, displaying the character, performing other game processing, etc.

On the other hand, when the finger or touch pen is found to have been released from the touch panel in step S302 (step S302; No), the trajectory information area and the closed curve area are cleared (step S316), and the flow proceeds to step S312.

Note that in step S316 the trajectory information area and the closed curve area may be held as they are and, rather than abruptly cleared, cleared after the amount of time since the detection of pressed coordinate or since the detection of a closed curve exceeds a certain amount time. In such a case, rather than having the trajectory and closed curve immediately disappear after the finger or touch pen is released, the user can be shown the attenuated disappearance of the trajectory and closed curve.

In this manner, the present embodiment makes it possible to acquire a series of closed curves from a trajectory of a spiral-shaped graphic that is easy for a person to enter, and acquire input information indicating the intensity of the vortex motion intended by the person from the time interval at which the closed curves are detected.

Note that the present application claims priority based on Japanese Patent Application No. 2006-037735, the contents of which are incorporated herein by reference to the fullest extent permitted by the law of the designated country.

INDUSTRIAL APPLICABILITY

As described above, according to the present invention, it is possible to provide a trajectory information processing device and a trajectory information processing method suitable for acquiring from a trajectory of a spiral-shaped graphic that is easy for a person to enter the input information intended by the person, a computer readable information recording medium storing a program for realizing these on a computer, and the program.

The invention claimed is:

1. A trajectory information processing device comprising:
   an input receiving unit which receives input of coordinate information of points included in a continued trajectory by a user in the order in which the trajectory is drawn;
   a coordinate storage unit which, upon receipt of input of said coordinate information, stores the input coordinate information which was received in the order the input was received;
   a closed curve storage unit which stores closed curve information; a closed curve acquisition unit which repeatedly performs the following:
      when the coordinate information whose input was received is newly stored in said storage unit, said closed curve acquiring unit determines if one of the line segments that connects adjacently stored coordinate information other than the newly stored coordinate information from among the sequentially stored coordinate information, and a new line segment that connects the newly stored coordinate information and the coordinate information stored immediately before the newly stored coordinate information cross over each other and, if the new line segment crosses over the one of the line segments:
      (a) newly stores the closed curve information which specifies the current time as the time at which the closed curve was acquired in said closed curve storage unit; and
      (b) removes coordinate information stored prior to the newly stored coordinate information from said coordinate storage unit, and inserting the coordinate information of the point of the crossover immediately before the newly stored coordinate information so as to update said coordinate storage unit; and
   a vortex information outputting unit which, when closed curve information is newly stored in said closed curve storage unit, calculates the time interval between the time at which the closed curve specified in the newly stored closed curve information is acquired and the time at which the closed curve specified in the closed curve information stored immediately before said newly stored closed curve information is acquired, and outputs a numeric value associated in advance with the calculated time interval as parameter information specified by the user.

2. The trajectory information processing device according to claim 1, wherein:
   said closed curve acquisition unit calculates: (c) the barycentric coordinates of a closed curve, which has vertices at positions corresponding to the coordinate information of the crossover point and, from among the sequentially stored coordinate information, the coordinate information from the lately stored coordinate information from among the adjacently stored coordinate information that form a line segment that includes the crossover point to the coordinate information stored immediately before the newly stored coordinate information, and further specifies said calculated coordinates in the closed curve information as the barycentric coordinate of the closed curve; and
   said vortex information outputting unit further outputs when closed curve information is newly stored in said closed curve information storage unit the position of the barycenter of the closed curve specified in the newly stored closed curve information as the position information specified by the user at the time specified in the newly stored closed curve information.

3. The trajectory information processing device according to claim 2, further comprising:
- a position storage unit which stores a position of a character disposed within a virtual space wherein the trajectory is drawn; and
- a position updating unit that performs simulation wherein a force is exerted on the character, wherein the force is directed from the position of said stored character toward the position specified in the position information last outputted by said vortex information outputting unit, and of a size specified in the parameter information last outputted by said vortex information outputting unit, and that updates the position of the character stored in said position storage unit.

4. The trajectory information processing device according to claim 3, further comprising:
- an attack parameter storage unit which stores a numeric value of an attack power parameter of the character; and
- a parameter updating unit which increases the numeric value of the attack power parameter of the character when parameter information is outputted by said vortex information outputting unit, by only an increment associated in advance so that the numeric value of the attack power parameter increases to the extent the parameter information decreases.

5. The trajectory information processing device according to claim 3, wherein:
- said closed curve acquisition unit further calculates the area of the region enclosed in the closed curve from the coordinate information of the positions of the vertices of the closed curve, and further specifies said calculated area in the closed curve information as the area of the region enclosed in the closed curve so as to newly store that information in the closed curve storage unit; and
- said position updating unit uses, instead of the last outputted parameter information, as the size of the force exerted on the character, the value of the product of the numeric value specified in the last outputted parameter information and the area of the region enclosed in the closed curve specified in the newly stored closed curve information.

6. A trajectory information processing device comprising:
- an input receiving unit which receives input, from a user, of coordinate information of a trajectory;
- a closed curve acquisition unit which repeatedly performs the followings for coordinate information of a trajectory whose input was received:
  - (a) acquiring a closed curve wherein the trajectory crosses over the trajectory for the first time after its starting point; and
  - (b) removing the closed curve and a preceding curve from the trajectory, and making the crossover point as the new starting point; and
- a vortex information outputting unit which outputs changes in the time interval at which said closed curve and any preceding closed curves are acquired as information indicating the intensity of vortex motion of the trajectory.

7. A trajectory information processing method comprising:
- an input receiving step of receiving input, from a user, of coordinate information of a trajectory on an input receiving unit and storing said coordinate information on a coordinate storage unit;
- a closed curve acquisition step of repeatedly performing the followings for coordinate information of a trajectory whose input was received:
  - (a) acquiring a closed curve, using a closed curve acquiring unit, wherein the trajectory crosses over the trajectory for the first time after its starting point and storing closed curved information in a closed curve storage unit; and
  - (b) removing the closed curve and a curve preceding thereto from the trajectory and the closed curve storage unit, and making the crossover point as the new starting point; and
- a vortex information outputting step of outputting changes in the time interval at which said closed curve and any preceding closed curves are acquired as information indicating the intensity of the vortex motion of the trajectory.

8. A non-transitory computer-readable information recording medium storing a program for controlling a computer to function as:
- an input receiving unit which receives input, from a user, of coordinate information of a trajectory;
- a closed curve acquisition unit which repeatedly performs the followings for coordinate information of a trajectory whose input was received:
  - (a) acquires a closed curve wherein the trajectory crosses over the trajectory for the first time after its starting point; and
  - (b) removes the closed curve and a curve preceding thereto from the trajectory, and making the crossover point as the new starting point; and
- a vortex information outputting unit which outputs changes in the time interval at which said closed curve and any preceding closed curves are acquired as information indicating the intensity of the vortex motion of the trajectory.

* * * * *